United States Patent
Lim et al.

(10) Patent No.: US 11,829,626 B2
(45) Date of Patent: Nov. 28, 2023

(54) STORAGE DEVICE AND OPERATING METHOD OF STORAGE DEVICE

(71) Applicant: SAMSUNG ELECTRONICS CO., LTD., Suwon-si (KR)

(72) Inventors: Jaehwan Lim, Seongnam-si (KR); Sung-Wook Kim, Suwon-si (KR); Jae Eun Kim, Yongin-si (KR); Daehun You, Seoul (KR); Walter Jun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 157 days.

(21) Appl. No.: 17/360,099

(22) Filed: Jun. 28, 2021

(65) Prior Publication Data

US 2022/0137848 A1   May 5, 2022

(30) Foreign Application Priority Data

Nov. 2, 2020 (KR) .......................... 10-2020-0144166

(51) Int. Cl.
| | |
|---|---|
| *G06F 3/06* | (2006.01) |
| *G06F 1/324* | (2019.01) |
| *G06F 11/07* | (2006.01) |
| *G06F 11/30* | (2006.01) |
| *G11C 16/32* | (2006.01) |
| *G11C 16/34* | (2006.01) |
| *G06F 1/3225* | (2019.01) |
| *G06F 1/3237* | (2019.01) |
| *G11C 7/04* | (2006.01) |
| *G11C 7/22* | (2006.01) |

(52) U.S. Cl.
CPC ............ *G06F 3/0647* (2013.01); *G06F 1/324* (2013.01); *G06F 3/0613* (2013.01); *G06F 3/0659* (2013.01); *G06F 3/0679* (2013.01); *G06F 11/0772* (2013.01); *G06F 11/3058* (2013.01)

(58) Field of Classification Search
CPC ........ G06F 3/0656; G06F 13/385; G09G 3/20
See application file for complete search history.

(56) References Cited

U.S. PATENT DOCUMENTS

| | | |
|---|---|---|
| 9,626,319 B2 | 4/2017 | Jacobson et al. |
| 9,864,719 B2 | 1/2018 | Jose et al. |
| 9,880,601 B2 | 1/2018 | Gough et al. |

(Continued)

FOREIGN PATENT DOCUMENTS

| | | |
|---|---|---|
| KR | 10-2015-0014002 A | 2/2015 |
| KR | 10-1915403 B1 | 12/2018 |

OTHER PUBLICATIONS

"PCI Express Base Specification Revision 5.0 Version 1.0," PCI-SIG, May 22, 2019, (1299 total pages).

*Primary Examiner* — Getente A Yimer
(74) *Attorney, Agent, or Firm* — Sughrue Mion, PLLC

(57) ABSTRACT

A storage device includes a nonvolatile memory device and a controller that accesses the nonvolatile memory device based on a request of an external host device, receives a first clock signal from the external host device, generates a second clock signal through frequency multiplication of the first clock signal, and communicates with the external host device based on the second clock signal. The controller requests the external host device to adjust a multiplication ratio for the frequency multiplication of the first clock signal.

20 Claims, 15 Drawing Sheets

(56) References Cited

U.S. PATENT DOCUMENTS

| | | |
|---|---|---|
| 10,452,122 B2 | 10/2019 | Shih et al. |
| 2008/0218232 A1* | 9/2008 | Jeon .................. G09G 3/20 |
| | | 327/165 |
| 2013/0238837 A1* | 9/2013 | Sawaoka ............ G06F 3/0656 |
| | | 711/103 |
| 2013/0318287 A1 | 11/2013 | Pyeon et al. |
| 2014/0365721 A1* | 12/2014 | Jo .................... G06F 13/385 |
| | | 711/103 |
| 2015/0032915 A1 | 1/2015 | Hur et al. |
| 2015/0160689 A1* | 6/2015 | Mylly .................... G06F 1/12 |
| | | 713/500 |
| 2018/0308532 A1* | 10/2018 | Roh .................... G11C 29/023 |
| 2019/0243410 A1 | 8/2019 | Saito et al. |
| 2019/0250930 A1 | 8/2019 | Erez |

\* cited by examiner

STORAGE DEVICE AND OPERATING METHOD OF STORAGE DEVICE

CROSS-REFERENCE TO RELATED APPLICATIONS

This application claims priority under 35 U.S.C. § 119 to Korean Patent Application No. 10-2020-0144166 filed on Nov. 2, 2020, in the Korean Intellectual Property Office, the disclosures of which are incorporated by reference herein in their entireties.

BACKGROUND

Example embodiments of the present disclosure relate to a semiconductor device, and more particularly, relate to a storage device reducing power consumption by adjusting a transmission rate and an operating method of the storage device.

A storage device may include a nonvolatile memory device and a controller to control the nonvolatile memory device. The controller may communicate with an external host device based on a given communication protocol. As association technologies develop, a speed at which the controller communicates with the external host device may increase.

As the speed at which the controller communicates with the external host device increases, the amount of power consumption according to the communication of the storage device is increasing. Accordingly, the overall power consumption of the storage device is increasing. The increase of power consumption may cause the reduction of quality of the storage device.

SUMMARY

Example embodiments of the present disclosure provide a storage device reducing power consumption according to a communication while communicating with an external host device at an improved communication speed and an operating method of the storage device.

According to an aspect of an example embodiment, there is provided a storage device including: a nonvolatile memory device; and a controller configured to: access the nonvolatile memory device based on a request from an external host device, receive a first clock signal from the external host device, generate a second clock signal through frequency multiplication of the first clock signal, and communicate with the external host device based on the second clock signal, wherein the controller is further configured to request the external host device to adjust a multiplication ratio for the frequency multiplication of the first clock signal.

According to an aspect of an example embodiment, there is provided a storage device including: a nonvolatile memory device; and a controller configured to: establish a link with an external host device based on two or more lanes, and access the nonvolatile memory device based on a request of the external host device transferred through the link, wherein the controller is further configured to request the external host device to disable at least one lane of two or more lanes included in the link.

According to an aspect of an example embodiment, there is provided an operating method of a storage device, the storage device including a nonvolatile memory device and a controller, the operating method including: establishing a link between the controller and an external host device, the link having a first link speed and a first link width; accessing, by the controller, the nonvolatile memory device in response to a request received from the external host device via the link; requesting, by the controller, the external host device to adjust a transmission rate defined by the first link speed and the first link width in response to detecting an operating speed decrease; and performing, by the controller, a retrain operation with the external host device.

BRIEF DESCRIPTION OF THE FIGURES

The above and other aspects of the present disclosure will become apparent by describing in detail example embodiments thereof with reference to the accompanying drawings.

DETAILED DESCRIPTION

Below, example embodiments will be described in detail and clearly to such an extent that one skilled in the art easily implements the present disclosure.

Figure 1:
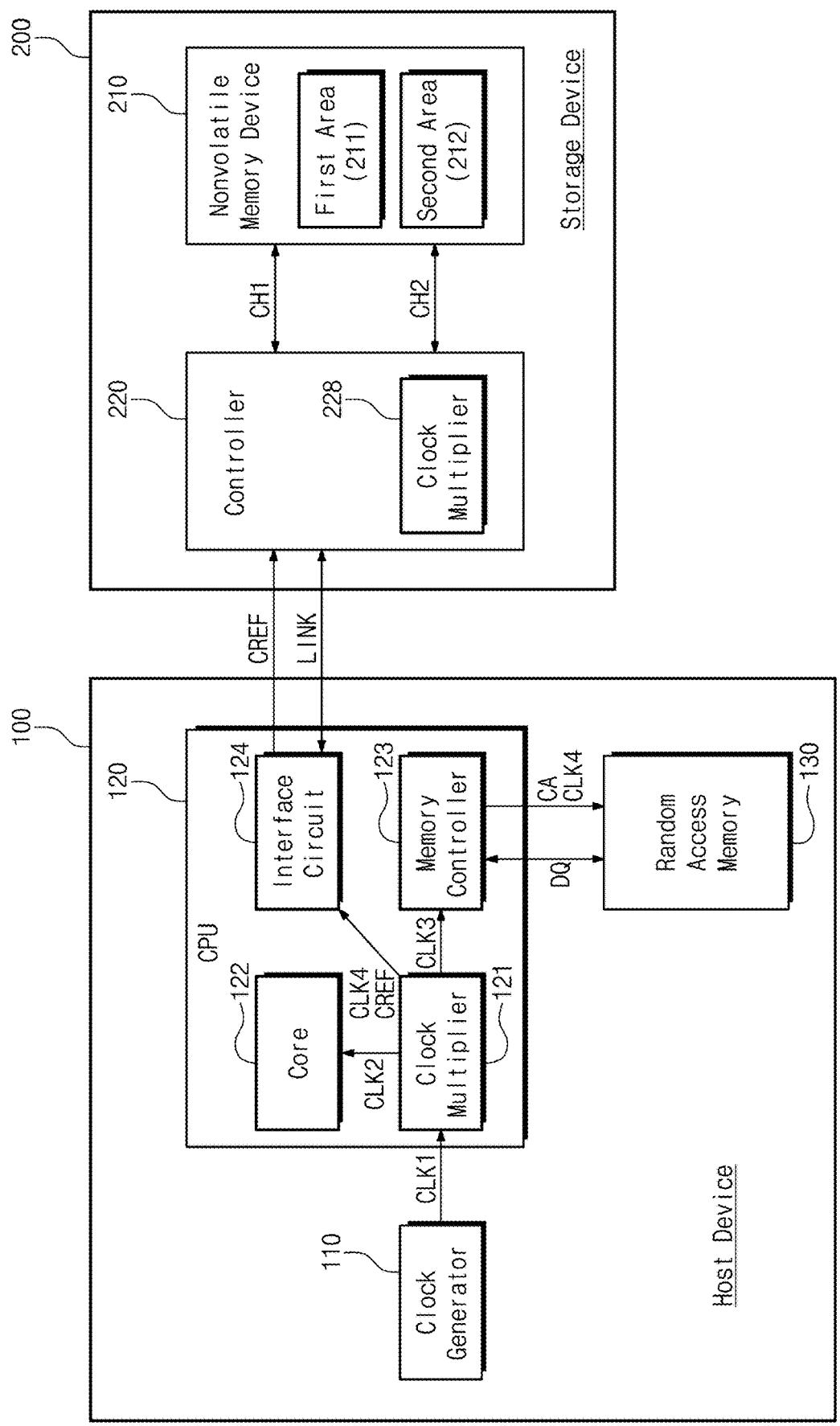
FIG. 1 illustrates a host device and a storage device according to an example embodiment.

FIG. 1 illustrates a host device 100 and a storage device 200 according to an example embodiment. Referring to FIG. 1, the host device 100 may be implemented with one of various electronic devices such as a computer, a notebook computer, a smartphone, a smart pad, and a smart watch. The host device 100 may include a clock generator 110, a central processing unit (CPU) 120, and a random access memory 130.

The clock generator 110 may generate a first clock signal CLK1. The first clock signal CLK1 may be supplied to the central processing unit 120.

The central processing unit 120 may include a clock multiplier 121, a core 122, a memory controller 123, and an interface circuit 124. The clock multiplier 121 may receive the first clock signal CLK1. The clock multiplier 121 may generate a second clock signal CLK2, a third clock signal CLK3, a fourth clock signal CLK4, and a reference clock signal CREF through frequency multiplication of the first clock signal CLK1.

The core 122 may receive the second clock signal CLK2 from the clock multiplier 121. The core 122 may operate in response to the second clock signal CLK2. The core 122 may control operations of the central processing unit 120 and may execute an operating system and applications. The core 122 may include two or more cores.

The memory controller 123 may receive the third clock signal CLK3 from the clock multiplier 121. Depending on a request of the core 122, the memory controller 123 may access the random access memory 130 based on the third clock signal CLK3. For example, the memory controller 123 may transmit a command and address CA and the fourth clock signal CLK4 to the random access memory 130. The memory controller 123 may exchange a data signal DQ with the random access memory 130.

The interface circuit 124 may receive the fourth clock signal CLK4 and the reference clock signal CREF from the clock multiplier 121. The interface circuit 124 may provide the reference clock signal CREF to the storage device 200. The interface circuit 124 may establish a link LINK with the storage device 200. Depending on a request of the core 122, the interface circuit 124 may exchange a signal with the storage device 200 through the link LINK.

The random access memory 130 may be used as a working memory of the host device 100. The central processing unit 120 may load codes for executing the operating system or the applications onto the random access memory 130. The central processing unit 120 may store data of the random access memory 130 in the storage device 200 or may load data read from the storage device 200 onto the random access memory 130.

The storage device 200 includes a nonvolatile memory device 210 and a controller 220. The nonvolatile memory device 210 may be implemented with at least one of various nonvolatile memory devices such as a NAND flash memory device, a phase change memory device, a ferroelectric memory device, a magnetic memory device, and a resistive memory device. The nonvolatile memory device 210 may include a first area 211 and a second area 212.

The controller 220 may receive the reference clock signal CREF from the external host device 100. The controller 220 may include a clock multiplier 228. The clock multiplier 228 may generate an internal clock signal through frequency multiplication of the reference clock signal CREF. For example, a frequency of the internal clock signal may be the same as a frequency of the fourth clock signal CLK4. The controller 220 may establish the link LINK with the host device 100 by using the internal clock signal. The controller 220 may access the nonvolatile memory device 210 depending on a request transmitted from the host device 100 through the link LINK or depending on an internally defined schedule.

The controller 220 may access the nonvolatile memory device 210 through a first channel CH1 and a second channel CH2. For example, the controller 220 may transmit a command and an address to the nonvolatile memory device 210 through the first channel CH1. The controller 220 may exchange data with the nonvolatile memory device 210 through the first channel CH1.

The controller 220 may transmit a first control signal to the nonvolatile memory device 210 through the second channel CH2. The controller 220 may receive a second control signal from the nonvolatile memory device 210 through the second channel CH2.

The controller 220 may use the first area 211 to perform a high-speed write operation. The controller 220 may use the second area 212 to perform a normal write operation. A write speed of the first area 211 may be higher than a write speed of the second area 212. For example, the controller 220 may use memory cells of the first area 211 as single level cells (SLCs), and may use memory cells of the second area 212 as multi-level cells (MLCs), triple level cells (TLCs), quadruple level cells (QLCs), or k-th level cells (k being an integer more than 4).

In an example embodiment, the controller 220 may open the second area 212 to the host device 100 as a storage capacity of the storage device 200. The controller 220 may not open the first area 211 to the host device 100 as a storage capacity of the storage device 200. When write data are received from the host device 100 together with a write request, the controller 220 may first write the write data into the first area 211. During an idle time where a request is not received from the host device 100, the controller 220 may allow the data written in the first area 211 to migrate to the second area 212.

In the case where a free capacity of the first area 211 is filled with the write data transmitted from the host device 100, the controller 220 may directly write the write data into the second area 212. As described above, a speed at which write data are written into the second area 212 may be slower than a speed at which write data are written into the first area 211. In the case of writing write data into the second area 212, that is, in response to an operating speed (or an access speed) decrease, the controller 220 may make a transmission rate of the link LINK for the communication with the host device 100 low, and thus, power consumption of the link LINK may decrease.

In an example embodiment, the communication between the host device 100 and the storage device 200 may establish the link LINK based on one of various communication protocols such as a peripheral component interconnection (PCI) protocol, a PCI-express (PCI-e) protocol, a nonvolatile memory-express (NVM-e) protocol, an advanced technology attachment (ATA) protocol, a serial advanced technology attachment (SATA) protocol, a serial attached SCSI (SAS), a universal flash storage (UFS) protocol, a universal serial bus (USB) protocol, an embedded multimedia card (eMMC) protocol, a small computer small interface (SCSI) protocol, a secure digital (SD) card protocol, a multi-media card (MMC) protocol, an embedded UFS (eUFS) protocol, and a compact flash card protocol.

Figure 2:
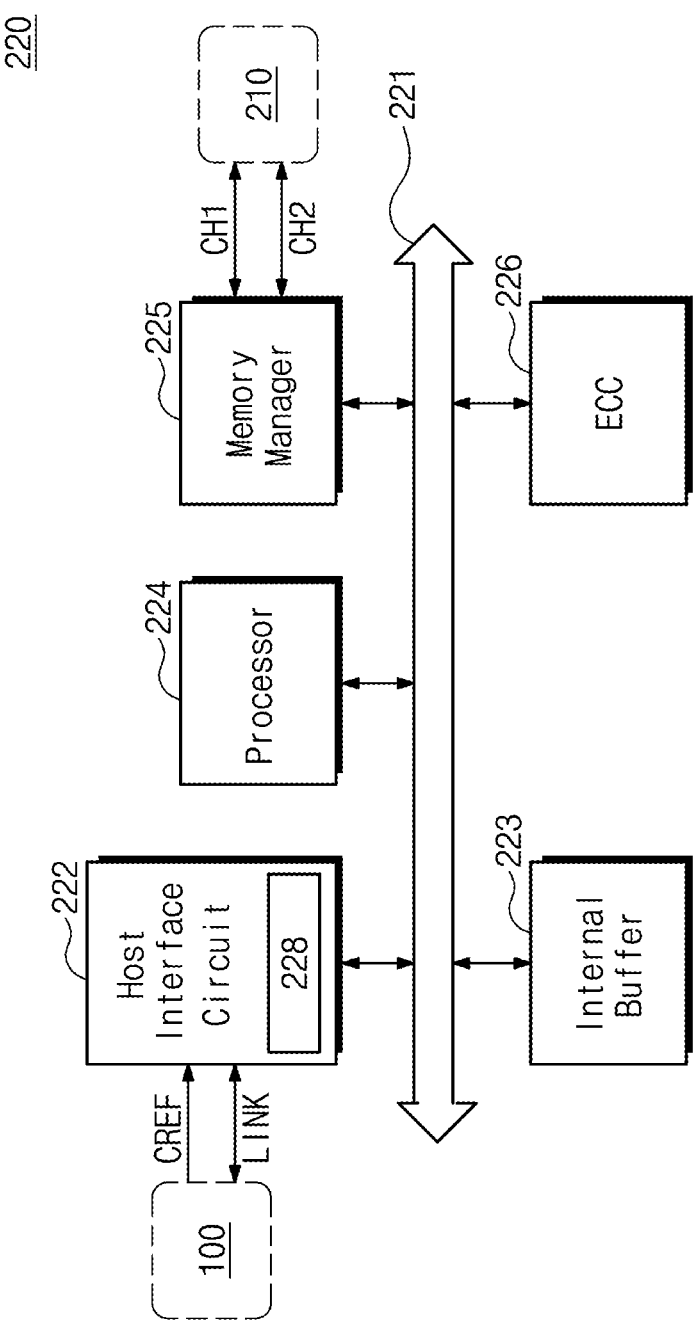
FIG. 2 illustrates a controller of a storage device of FIG. 1.

FIG. 2 illustrates the controller 220 of the storage device 200 of FIG. 1. Referring to FIGS. 1 and 2, the controller 220 may receive the reference clock signal CREF and may establish the link LINK with the external host device 100. The controller 220 may receive various requests for writing data in the nonvolatile memory device 210 or reading data from the nonvolatile memory device 210, from the external host device 100 through the link LINK.

The controller 220 may access the nonvolatile memory device 210 through the first channel CH1 and the second channel CH2. For example, the controller 220 may transmit a command and an address to the nonvolatile memory device 210 through the first channel CH1. The controller 220 may exchange data with the nonvolatile memory device 210 through the first channel CH1.

The controller 220 may transmit a first control signal to the nonvolatile memory device 210 through the second channel CH2. The controller 220 may receive a second control signal from the nonvolatile memory device 210 through the second channel CH2.

In an example embodiment, the controller 220 may be configured to control two or more nonvolatile memory devices. The controller 220 may provide first different channels and second different channels to two or more nonvolatile memory devices.

For another example, the controller 220 may provide one first channel so as to be shared by two or more nonvolatile memory devices. The controller 220 may provide a part of second channels so to be shared by two or more nonvolatile memory devices and may separately provide the remaining part thereof.

The controller 220 may include a bus 221, a host interface circuit 222, an internal buffer 223, a processor 224, a memory manager 225, and an error correction code (ECC) block 226.

The bus 221 may provide communication channels between components in the controller 220. The host interface circuit 222 may receive various requests from the external host device 100 and may parse the received requests. The host interface circuit 222 may store the parsed requests in the internal buffer 223. Also, the host interface circuit 222 may store data received from the external host device 100 in the internal buffer 223. The host interface circuit 222 may transmit data stored in the internal buffer 223 to the external host device 100.

The host interface circuit 222 may transmit various responses to the external host device 100. The host interface circuit 222 may exchange signals with the external host device 100 in compliance with a given communication protocol. The host interface circuit 222 may include the clock multiplier 228. The clock multiplier 228 may generate an internal clock signal for establishing the link LINK and communicating with the host device 100, based on the reference clock signal CREF.

The internal buffer 223 may include a random access memory. For example, the internal buffer 223 may include a static random access memory or a dynamic random access memory.

The processor 224 may drive an operating system or firmware for driving the controller 220. The processor 224 may read the parsed requests stored in the internal buffer 223 and may generate commands and addresses for controlling the nonvolatile memory device 210. The processor 224 may provide the generated commands and addresses to the memory manager 225.

The processor 224 may store various metadata for managing the storage device 200 in the internal buffer 223. The processor 224 may temporarily store data, which are received from the host device 100 and are to be written in the nonvolatile memory device 210, or data, which are read from the nonvolatile memory device 210 and are to be transmitted to the host device 100, in the internal buffer 223.

The processor 224 may control the host interface circuit 222 such that the data stored in the internal buffer 223 are transmitted to the external host device 100. The processor 224 may control the memory manager 225 such that data received from the nonvolatile memory device 210 are stored in the internal buffer 223. The processor 224 may control the host interface circuit 222 such that data received from the external host device 100 are stored in the internal buffer 223.

The error correction code block 226 may perform error correction encoding on data to be transmitted to the nonvolatile memory device 210 by using an error correction code ECC. The error correction code block 226 may perform error correction decoding on data received from the nonvolatile memory device 210 by using the error correction code ECC.

Figure 3:
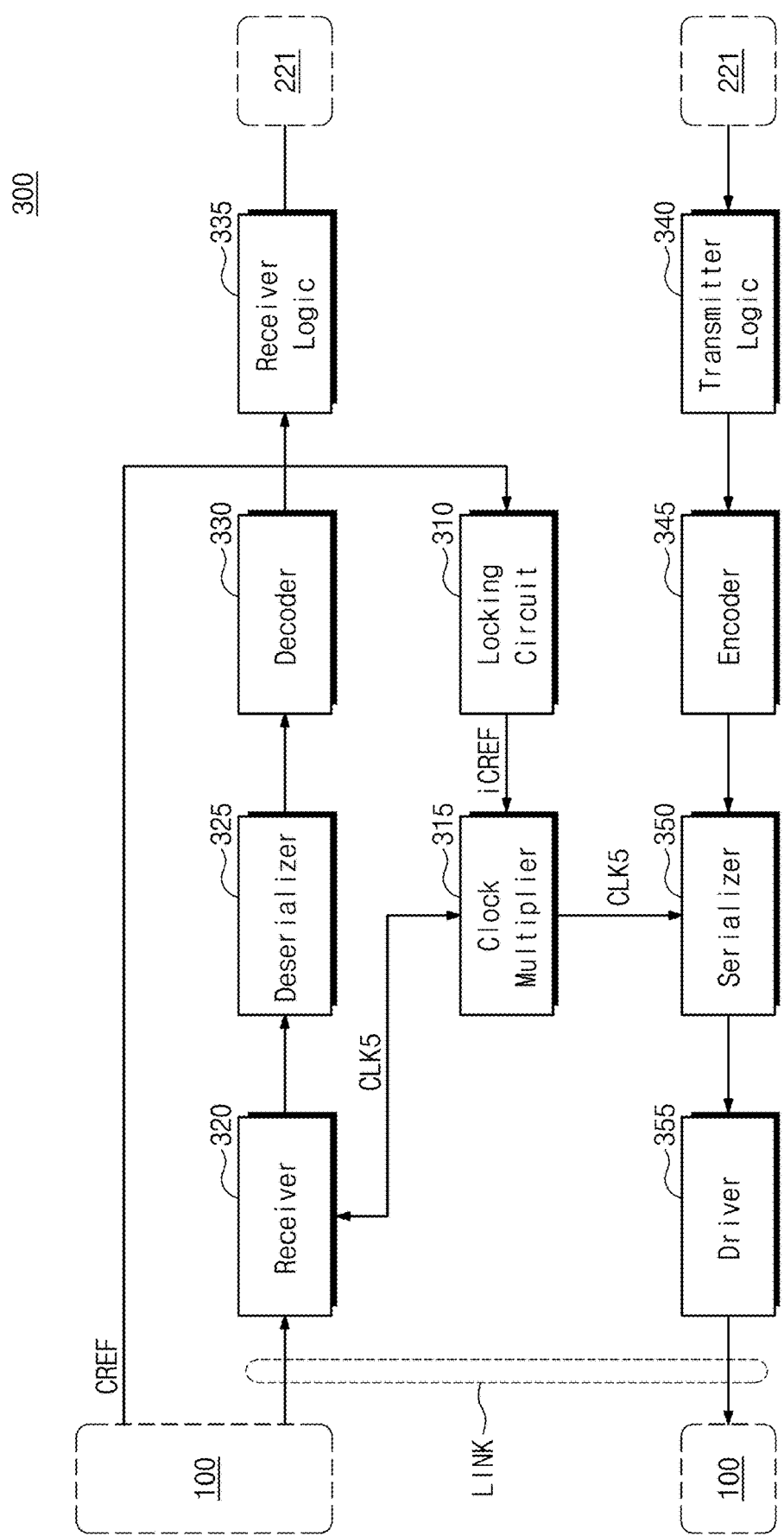
FIG. 3 illustrates a host interface circuit.

FIG. 3 illustrates a host interface circuit 300. Referring to FIGS. 1, 2, and 3, the host interface circuit 300 may correspond to the host interface circuit 222 of FIG. 2.

The host interface circuit 300 may include a locking circuit 310, a clock multiplier 315, a receiver 320, a deserializer 325, a decoder 330, receiver logic 335, transmitter logic 340, an encoder 345, a serializer 350, and a driver 355.

The locking circuit 310 may receive the reference clock signal CREF and may output an internal reference clock signal iCREF synchronized with the reference clock signal CREF. For example, the locking circuit 310 may include a delay locked loop or a phase locked loop.

The clock multiplier 315 may receive the internal reference clock signal iCREF from the locking circuit 310. The clock multiplier 315 may generate a fifth clock signal CLK5 through frequency multiplication of the internal reference clock signal iCREF. The clock multiplier 315 may correspond to the clock multiplier 228 of FIGS. 1 and 2.

The receiver 320 may receive a signal from the host device 100 through the link LINK. The receiver 320 may receive a signal in synchronization with the fifth clock signal CLK5. The signal received by the receiver 320 may be a signal of a first type (e.g., a serial type). The signal received by the receiver 320 may be a portion of a packet or a portion of a symbol. The receiver 320 may amplify the received signal and may provide the amplified signal to the deserializer 325.

The deserializer 325 may receive a signal from the receiver 320. The deserializer 325 may deserialize the received signal. The deserializer 325 may provide the decoder 330 with a deserialized signal of a second type (e.g., a parallel type).

The decoder 330 may receive a signal of the second type from the deserializer 325. The decoder 330 may perform decoding on the signal of the second type. For example, the decoder 330 may perform symbol decoding to extract bits from a symbol. The decoder 330 may extract 8-bit data from a 10-bit symbol. Alternatively, the decoder 330 may extract 128-bit data from a 130-bit symbol. The decoder 330 may provide the decoded signal to the receiver logic 335.

The receiver logic 335 may receive the decoded signal from the decoder 330. The receiver logic 335 may perform pattern check on the decoded signal to determine compliance. For example, the receiver logic 335 may determine whether the decoded signal coincides with a communication protocol (e.g., a PCIe); when the decoded signal coincides with the communication protocol (e.g., a PCIe), the receiver logic 335 may determine which generation corresponds to a generation of the communication protocol coinciding with the decoded signal. When the pattern check is successful, the receiver logic 335 may provide the decoded signal to the processor 224 through the bus 221.

The transmitter logic 340 may receive a signal of the second type (e.g., a parallel type) from the processor 224 through the bus 221. The transmitter logic 340 may combine the signal of the second type and a pattern. For example, the pattern may indicate which generation corresponds to the communication protocol (e.g., a PCIe). The transmitter logic 340 may provide the combined signal to the encoder 345.

The encoder 345 may receive the combined signal from the transmitter logic 340. The encoder 345 may perform encoding on the combined signal. For example, the encoder 345 may perform symbol encoding to generate a symbol from bits of the combined signal. The encoder 345 may generate a 10-bit symbol from 8-bit data. Alternatively, the encoder 345 may generate a 130-bit symbol from 128-bit data. The encoder 345 may provide the encoded signal to the serializer 350.

The serializer 350 may receive the encoded signal from the encoder 345. The serializer 350 may receive the fifth clock signal CLK5 from the clock multiplier 315. The serializer 350 may generate a signal of the first type (e.g., a serial type) by performing serialization on the encoded signal based on the fifth clock signal CLK5. The serializer 350 may provide the signal of the first type to the driver 355.

The driver 355 may receive the signal of the first type from the serializer 350. The driver 355 may transmit the signal of the first type to the host device 100.

The interface circuit 124 of the host device 100 and the host interface circuit 222 of the controller 220 in the storage device 200 may match a frequency multiplication ratio at which the clock multiplier 121 generates the fourth clock signal CLK4 and a frequency multiplication ratio at which the clock multiplier 228 or 315 generates the fifth clock signal CLK5. For example, depending on a generation version of the communication protocol (e.g., a PCIe), a frequency multiplication ratio may be selected as a value including 25 times, 50 times, 80 times, 160 times, or 320 times.

As a frequency multiplication ratio increases, the power consumption of the clock multiplier 121 of the host device 100 and the clock multiplier 228 or 315 of the storage device 200 may increase. As a frequency multiplication ratio decreases, the power consumption of the clock multiplier 121 of the host device 100 and the clock multiplier 228 or 315 of the storage device 200 may decrease.

In response to an operating speed decrease, the storage device 200 according to an example embodiment may request the host device 100 to decrease the multiplication ratios of the clock multiplier 121 of the host device 100 and the clock multiplier 228 or 315 of the storage device 200. In the case of an operating speed decrease, even though the host device 100 transmits data to the storage device 200 at a high speed, a speed at which the storage device 200 processes the received data may be low. An example of the storage device 200 processing data being low is performing a background operation (e.g., an urgent background operation) such as a migration operation of data from the first area 211 to the second area 212, from the second area 212 to the first area 211, inside the first area 211 or inside the second area, a garbage collection operation, a scrubbing operation, etc. Another example of the storage device 200 processing data being low may be described below. That is, an actual speed at which data are processed may place a limit on an operating speed of the storage device 200.

Accordingly, by decreasing the frequency multiplication ratios as an operating speed decreases, the power consumption of the host device 100 and the storage device 200 may be reduced while processing data at an optimum speed.

Figure 4:
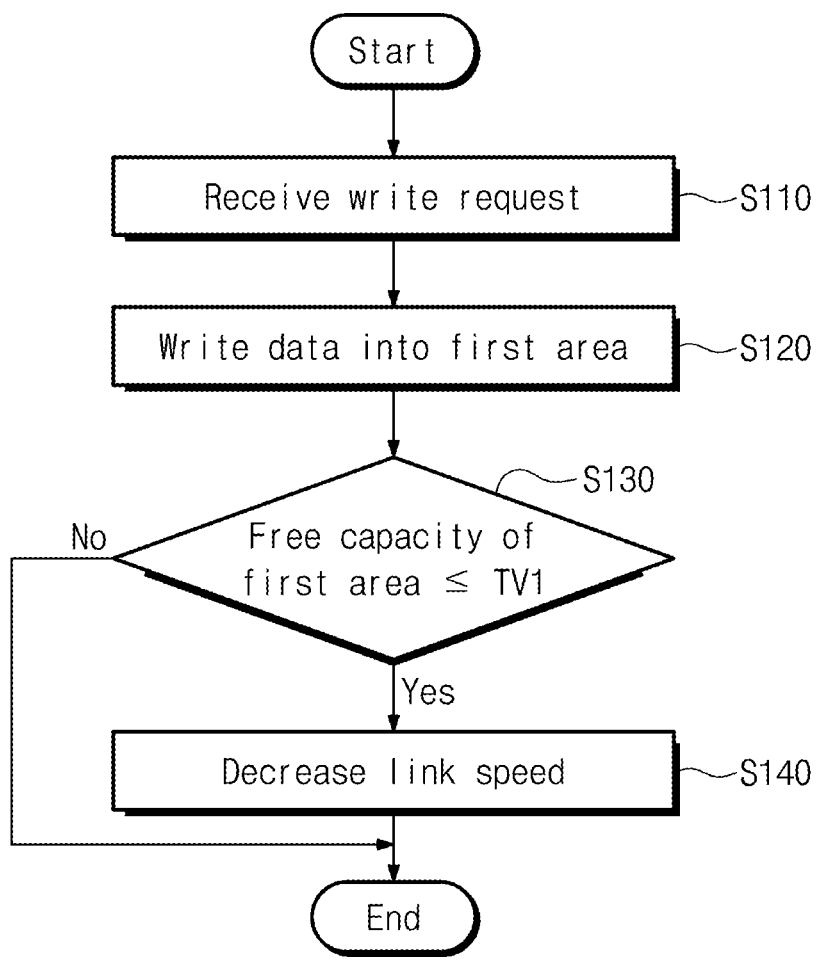
FIG. 4 illustrates a first example of an operating method of a storage device according to an example embodiment.

FIG. 4 illustrates a first example of an operating method of the storage device 200 according to an example embodiment. Referring to FIGS. 1, 2, 3, and 4, in operation S110, the controller 220 may receive a write request from the host device 100. In operation S120, the controller 220 may write write-requested data into the first area 211 of the nonvolatile memory device 210.

In operation S130, the controller 220 may determine whether a free capacity of the first area 211 is smaller than or equal to a first threshold value TV1. For example, the first threshold value TV1 may be determined as a ratio of a total capacity of the first area 211. The first threshold value TV1 may be variously determined, for example, as 5%, 10%, 15%, 20%, etc.

The determination that the free capacity of the first area 211 (faster area) is smaller than or equal to the first threshold value TV1 may lead to the following congestion event. The congestion event is that additional data received from the host device 100 cause a direct write operation to the second area 212 (slower area). A write speed of the second area 212 may be slower than a write speed of the first area 211. That is, when the free capacity of the first area 211 is smaller than or equal to the first threshold value TV1, a write speed at which the controller 220 writes data into the nonvolatile memory device 210 may decrease, a speed at which the controller 220 accesses the nonvolatile memory device 210 may decrease, and an operating speed of the storage device 200 may decrease. Thus, the congestion event causes the operating speed of the storage device 200 to decrease.

In response to the operating speed of the storage device 200 decreasing (congestion event), in operation S140, the controller 220 may request the host device 100 to decrease a link speed. For example, the controller 220 may request the host device 100 to decrease the multiplication ratios of the clock multiplier 121 of the host device 100 and the clock multiplier 228 or 315 of the storage device 200. In an example embodiment, the adjustment of multiplication ratios may be requested such that a data transfer rate of the link LINK is similar to a speed at which the controller 220 writes data into the second area 212 (slower area).

That is, the controller 220 may detect the reduction of an operating speed in response to the free capacity of the first area 211 decreasing. In response to the operating speed decrease, the controller 220 may request the host device 100 to decrease a link speed. Accordingly, the power consumption of the host device 100 and the storage device 200 may be reduced to a state in which a speed of processing write data is not hindered.

Figure 5:
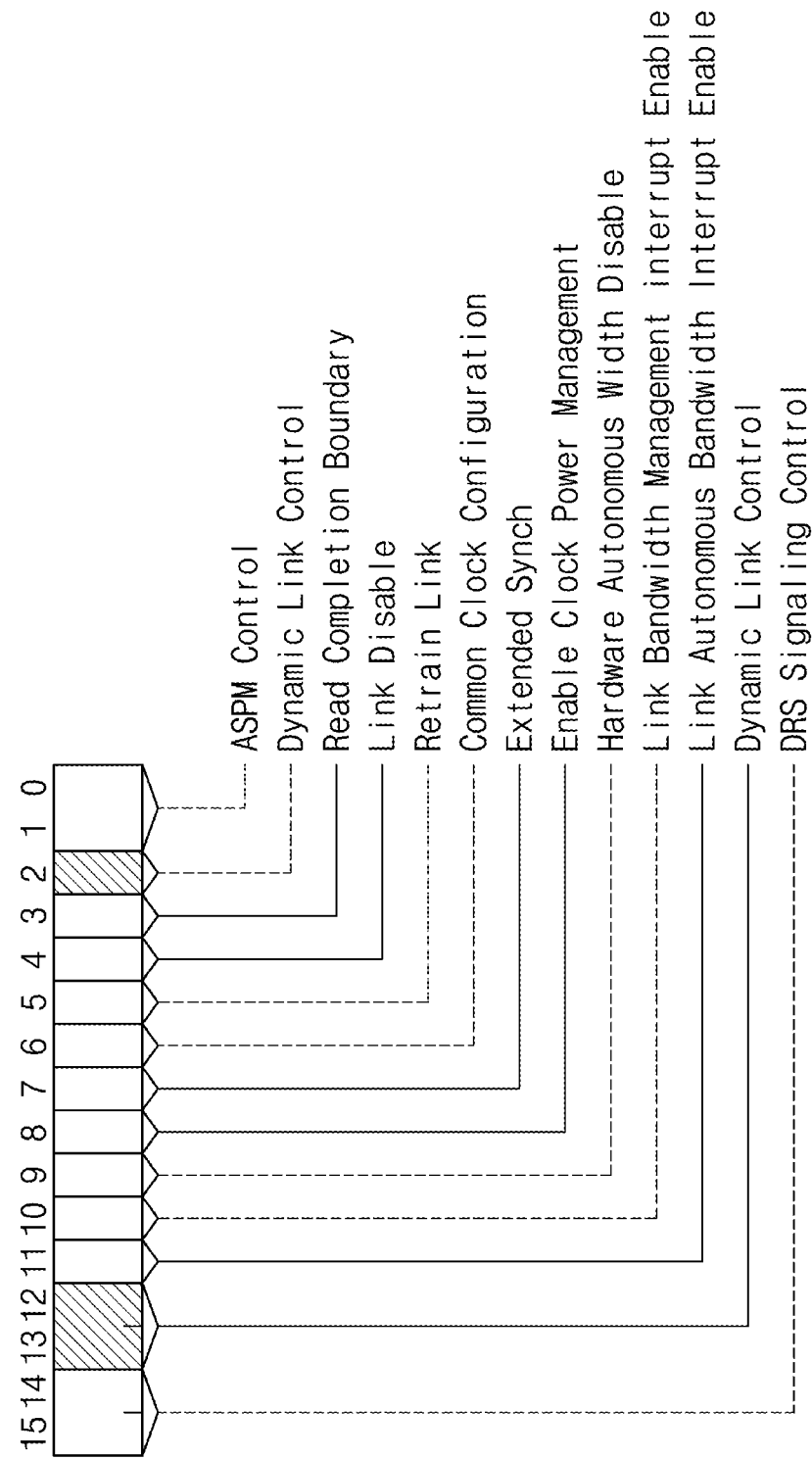
FIG. 5 illustrates an example of a register of a controller.

FIG. 5 illustrates an example of a register of the controller 220. The register illustrated in FIG. 5 may be, for example, a link control register for a control of the link LINK. In FIG. 5, the bits of the register are labelled from right to left (0,1), 2, 3, 4, 5, 6, 7, 8, 9, 10, 11, (12,13), and (14,15). Parentheses are used to indicate where two bits together are used for control or configuration of something. Also, the three bits (2, 12, and 13) jointly form a control configuration. The roles of the register bits are described below.

Referring to FIGS. 1 and 5, a 0-th bit and a first bit of the register may be used for active state power management (ASPM) control. A third bit of the register may be used for read completion boundary. A fourth bit of the register may be used for link disable. A fifth bit of the register may be used to retrain the link LINK. A retrain may refer to redoing some parts of a transmitter equalization process of the link LINK.

A sixth bit of the register may be used for common clock configuration. A seventh bit of the register may be used for extended synch. An eighth bit of the register may be used to enable clock power management. A ninth bit of the register may be used for hardware autonomous width disable.

A tenth bit of the register may be used for a link bandwidth management interrupt enable. An eleventh bit of the register may be used for a link autonomous bandwidth interrupt enable. A fourteenth bit and a fifteenth bit of the register may be used for device readiness status (DRS) signaling control.

A second bit, a twelfth bit, and a thirteenth bit of the register may be used for dynamic link control. The dynamic link control may include a technical feature that the storage device 200 requests the host device 100 to change a transmission rate of the link LINK in response to a change of an operating speed. The dynamic link control may be a feature of the example embodiments described above and the example embodiments described below.

At least one of the second bit, the twelfth bit, and the thirteenth bit of the register may be used to indicate an enable or disable of the dynamic link control. When an operating speed does not decrease, the controller 220 may set at least one of the second bit, the twelfth bit, and the thirteenth bit of the register to a first value (e.g., "0").

In response to an operating speed decrease, the controller 220 may set at least one of the second bit, the twelfth bit, and the thirteenth bit of the register to a second value (e.g., "1"). Also, in response to the operating speed decrease, the controller 220 may request a retrain operation from the host device 100 by setting the fifth bit of the register to a specific value.

In an example embodiment, in response to at least one of the second bit, the twelfth bit, and the thirteenth bit of the register being set to the second value and the fifth bit of the regulator being set to the specific value, the controller 220 may transmit an interrupt to the host device 100. The host device 100 may read the register in response to the interrupt. Afterwards, the host device 100 and the storage device 200 may decrease multiplication ratios through the retrain operation.

For another example, the host device 100 may perform polling to read the register periodically. After reading the register, the host device 100 and the storage device 200 may decrease multiplication ratios through the retrain operation.

Figure 6:
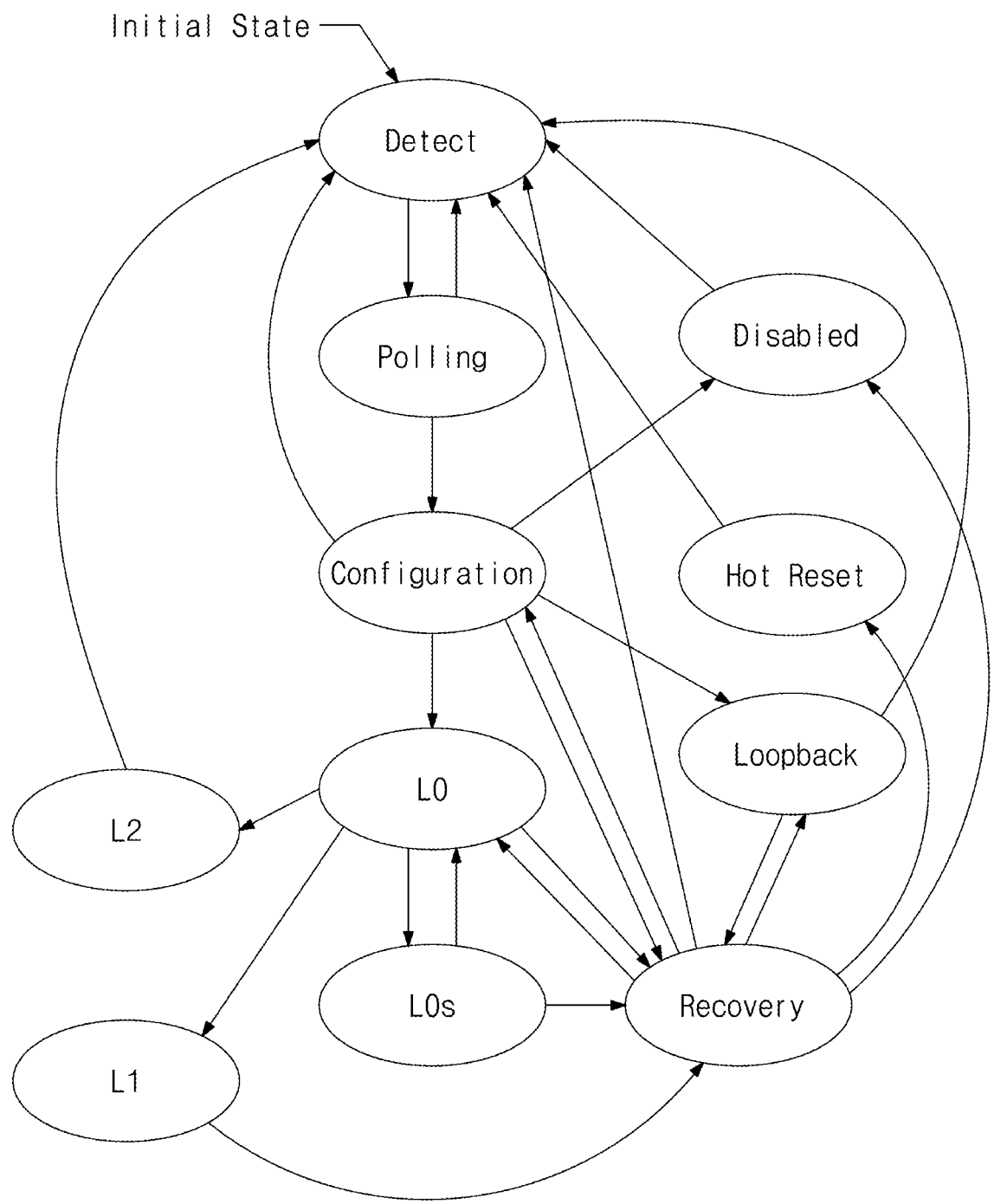
FIG. 6 illustrates a process in which a storage device establishes a link with a host device.

FIG. 6 illustrates a process in which the storage device 200 establishes the link LINK with the host device 100. Referring to FIGS. 1 and 6, an initial state may be a detect state. In the detect state, when a connection with any other device (e.g., the host device 100) is detected, the storage device 200 may enter a polling state.

In the polling state, a generation version of a protocol (e.g., a PCIe) of the host device 100 and a generation version of a protocol (e.g., a PCIe) of the storage device 200 may be checked, and a data transfer rate may be determined based on the highest generation version compatible with each other. Also, in the polling state, the controller 220 may set a bit lock, a symbol lock, a block lock, and a lane polarity. In the polling state, the controller 220 may transmit TS1 and TS2 being an ordered set at a transmission rate of 2.5 GT/s (gigatransfers per second). A transfer may refer to one data transfer event in a given data-transfer channel.

After the polling state, the storage device 200 may enter a configuration state. In the configuration state, the controller 220 may set the number of lanes of the link LINK, that is, a link width. Also, in the configuration state, the controller 220 may exchange TS1 and TS2 with the host device 100 at a transmission rate of 2.5 GT/s. The controller 220 may allocate a lane number and may check and calibrate a lane reversal. The controller 220 may de-skew a lane-to-lane timing difference (reduce a time skew between lanes).

After the configuration state, the controller 220 may enter an L0 state. The L0 state may be a normal state. In the L0 state, the controller 220 may communicate with the host device 100 through the link LINK.

An L0s state may be an ASPM state. The controller 220 may reduce power consumption in the L0s state until the controller 220 enters the L0 state. An L1 state may be a power saving state in which power consumption is reduced more than in the L0s state. In an L2 state, a voltage low enough to detect a wake-up event may be used.

Entering a disabled state may be made when the controller 220 disables the link LINK. A loopback state may be a state that the controller 220 uses for test and fault isolation. A hot reset state may be used when the controller 220 resets the link LINK through in-band signaling.

A recovery state may be used for the controller 220 to adjust a data transfer rate. For example, in the recovery state, the controller 220 may adjust the frequency multiplication ratios of the clock multiplier 121 of the host device 100 and the clock multiplier 228 or 315 of the storage device 200. A recovery may occur if an error occurs on the link LINK and it is necessary to re-initialize the link LINK so that transfers can resume. After the recovery, the link LINK may be said to be recovered. If the link LINK is operating at a first operating speed and an error occurs, recovery may be performed. The first operating speed may then be said to be a recovered operating speed. Also see the discussion of FIG. 6 below, in which a transition is made from a recovery state to the normal state L0.

For example, by setting the dynamic link control bit of the link control register in the L0 state and requesting the retrain operation, the controller 220 may adjust the frequency multiplication ratios of the clock multiplier 121 of the host device 100 and the clock multiplier 228 or 315 of the storage device 200.

As the retrain operation is requested, the controller 220 may enter the recovery state and may adjust the frequency multiplication ratios of the clock multiplier 121 of the host device 100 and the clock multiplier 228 or 315 of the storage device 200. Afterwards, the controller 220 may return to the L0 state, may return to the configuration state, or may return to the detect state. Alternatively, the controller 220 may return to the detect state through the hot reset state.

Figure 7:
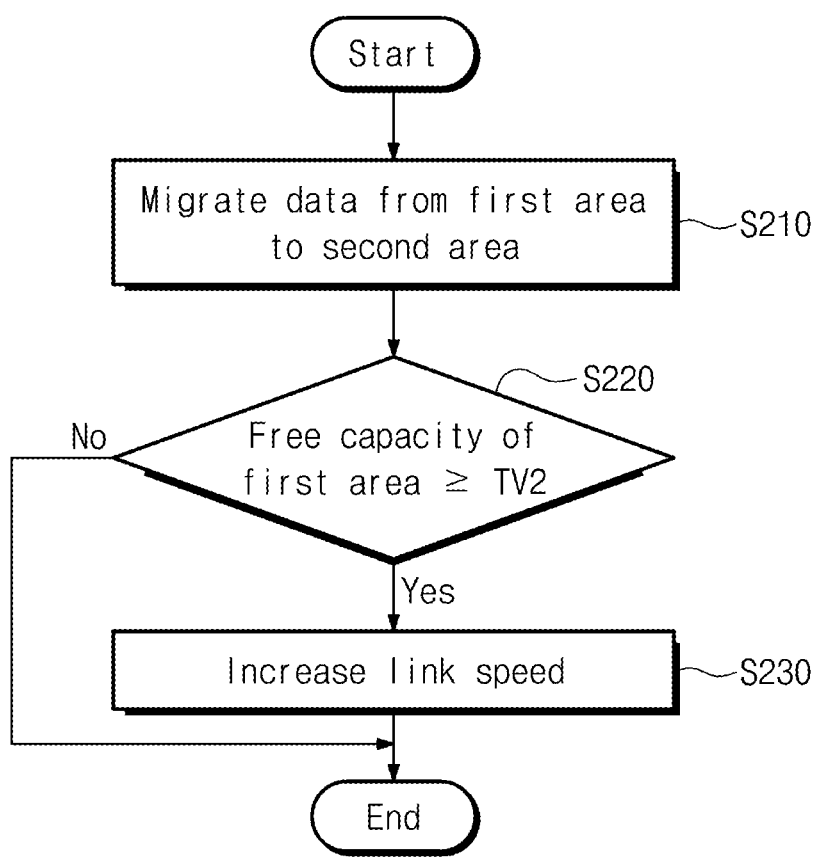
FIG. 7 illustrates a second example of an operating method of a storage device.

FIG. 7 illustrates a second example of an operating method of the storage device 200. Referring to FIGS. 1, 2, 3, and 7, in operation S210, the controller 220 may allow data written in the first area 211 of the nonvolatile memory device 210 to migrate to the second area 212. For example, the data that migrate to the second area 212 may be removed from the first area 211. That is, the free capacity of the first area 211 may increase.

In operation S220, the controller 220 may determine whether the free capacity of the first area 211 is greater than or equal to a second threshold value TV2. For example, the second threshold value TV2 may be determined as a ratio of a total capacity of the first area 211. The second threshold value TV2 may be variously determined, for example, as 25%, 30%, 35%, 40%, etc.

The determination that the free capacity of the first area 211 (faster area) is greater than or equal to the second threshold value TV2 may indicate the following speed-up opportunity. Recognizing the speed-up opportunity improves operating speed when additional data is received from the host device 100, the additional data causing a write operation to the first area 211. Specifically, A write speed of the first area 211 may be higher than a write speed of the second area 212 (slower area). That is, when the free capacity of the second area 212 is greater than or equal to the second threshold value TV2, a write speed at which the controller 220 writes data into the nonvolatile memory device 210 may increase (or may be recovered), a speed at which the controller 220 accesses the nonvolatile memory device 210 may increase (or may be recovered), and an operating speed of the storage device 200 may increase (or may be recovered). Thus, making use of the speed-up opportunity allows the operating speed of the storage device 200 to increase.

In response to the operating speed of the storage device 200 increasing (or being recovered), in operation S230, the controller 220 may increase (or recover) a data transfer rate of the link LINK. For example, the controller 220 may increase a link speed. The controller 220 may request an increase of a link speed by setting (or recovering) the dynamic link control bit of the register to the first value and requesting the retrain operation as described with reference to FIG. 5.

As described above, the host device 100 may read the register in response to an interrupt from the controller 220 or based on the polling. As described with reference to FIG. 6, the host device 100 and the controller 220 may increase (or recover) a link speed through the recovery state.

In an example embodiment, the operating speed of the storage device 200 may stepwise decrease. The nonvolatile memory device 210 may include three or more areas having different access (or write) speeds. When an access to a specific area (or a write operation for the specific area) is requested, the controller 220 may stepwise increase or decrease a data transfer rate of the link LINK. That is, multiplication ratios of the clock multiplier 121 of the host device 100 and the clock multiplier 228 or 315 of the storage device 200 may be stepwise adjusted.

For example, as an operating speed decreases to a first step, the multiplication ratios of the clock multiplier 121 of the host device 100 and the clock multiplier 228 or 315 of the storage device 200 may decrease to a first step. As the operating speed decreases to a second step, the multiplication ratios of the clock multiplier 121 of the host device 100 and the clock multiplier 228 or 315 of the storage device 200 may decrease to a second step.

As the operating speed is recovered to the first step, the multiplication ratios of the clock multiplier 121 of the host device 100 and the clock multiplier 228 or 315 of the storage device 200 may be recovered to the first step. As the operating speed is recovered to the second step, the multiplication ratios of the clock multiplier 121 of the host device 100 and the clock multiplier 228 or 315 of the storage device 200 may be recovered to the second step.

Figure 8:
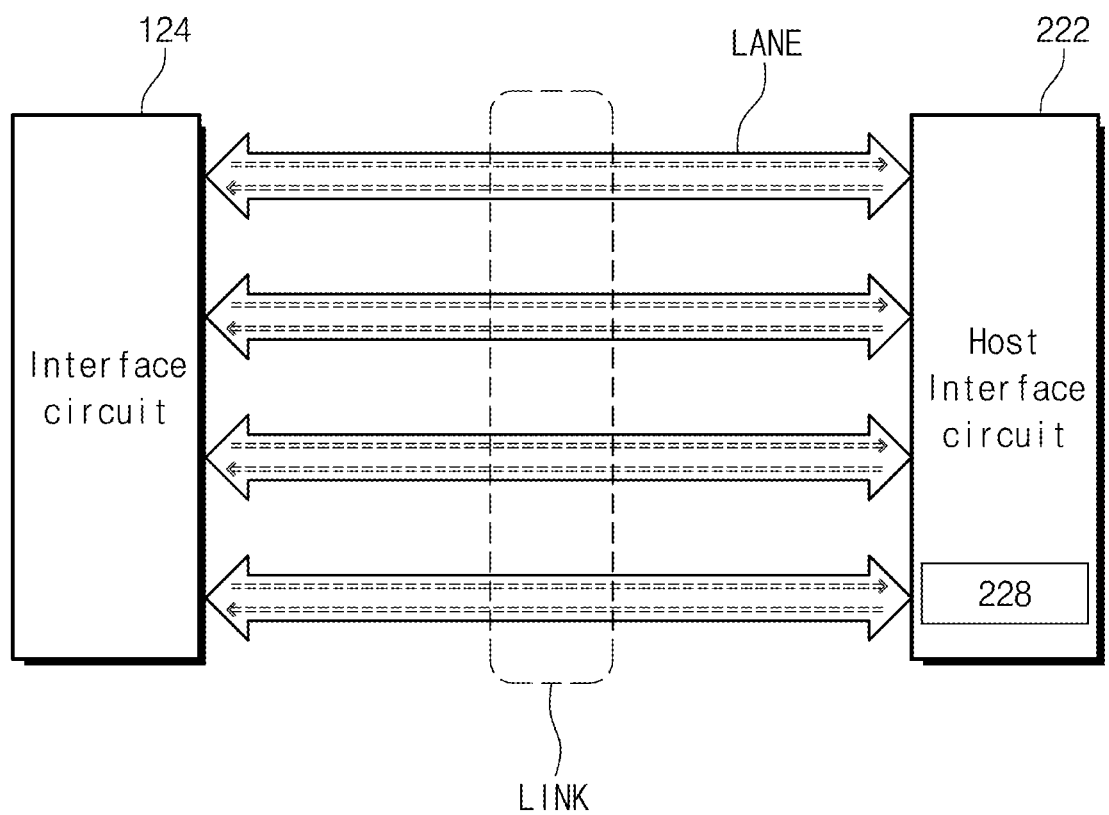
FIG. 8 illustrates an example of a link established between an interface circuit of a host device and a host interface circuit of a storage device.

FIG. 8 illustrates an example of the link LINK established between the interface circuit 124 of the host device 100 and the host interface circuit 222 of the storage device 200. Referring to FIGS. 1, 2, 3, and 8, the link LINK may include at least one lane LANE.

For example, the link LINK may include lanes LANE, the number of lanes corresponds to a number selected from numbers of 1, 2, 4, 8, and 16. In an example embodiment, it is assumed that four lanes LANE are included in the link LINK. The lanes LANE may transmit or receive signals at the same time. The lanes LANE may correspond to parallel signal lines. For example, each lane may contain two pairs of wires, one pair to send and one pair to receive. A link including one lane is thus made up of four wires. The lanes LANE may be set to have the same link speed.

A data transfer rate of the link LINK may be determined by a product of the number of lanes LANE included in the link LINK, that is, a link width and a link speed of each of the lanes LANE. To adjust a data transfer rate of the link LINK, the storage device 200 according to an example embodiment may adjust a link width, that is, the number of lanes LANE included in the link LINK.

Each of the lanes LANE may include a transmit channel and a receive channel. The transmit channel of the host interface circuit 222 may correspond to a dotted arrow facing toward the interface circuit 124 from the host interface circuit 222. The receive channel of the host interface circuit 222 may correspond to a dotted arrow facing toward the host interface circuit 222 from the interface circuit 124. Each of the transmit channel and the receive channel may include complementary signal lines.

Figure 9:
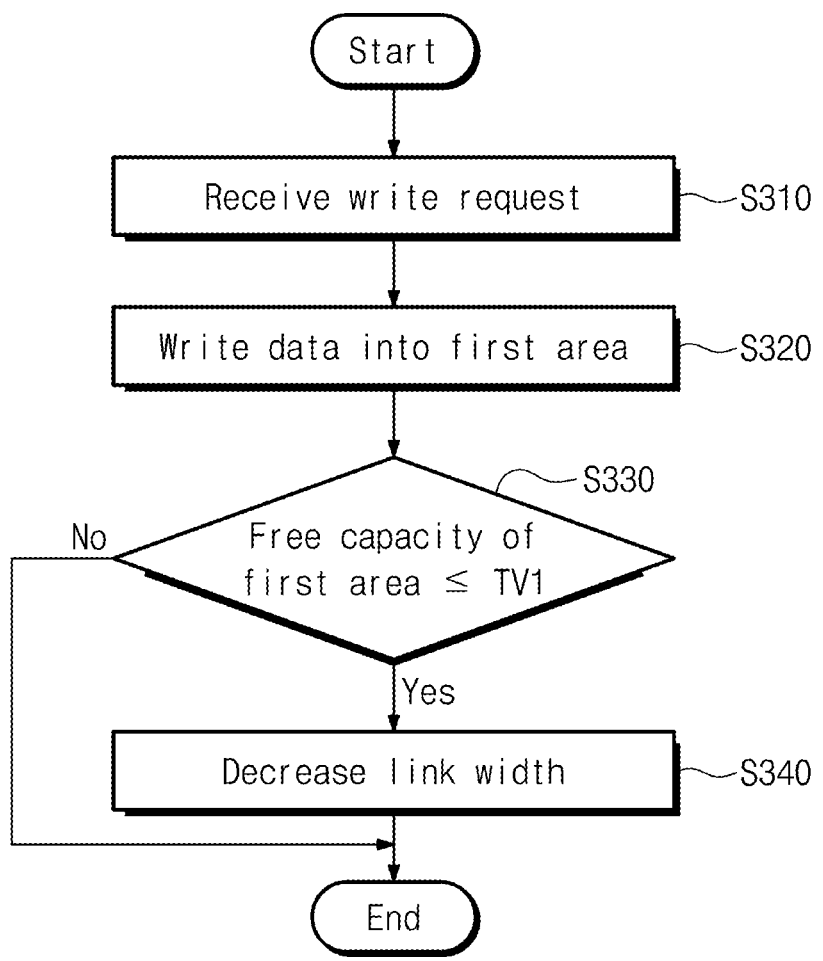
FIG. 9 illustrates a third example of an operating method of a storage device.

FIG. 9 illustrates a third example of an operating method of the storage device 200. Referring to FIGS. 1, 2, 3, 8, and 9, in operation S310, the controller 220 may receive a write request from the host device 100. In operation S320, the controller 220 may write write-requested data into the first area 211 of the nonvolatile memory device 210.

In operation S330, the controller 220 may determine whether a free capacity of the first area 211 is smaller than or equal to the first threshold value TV1. For example, the first threshold value TV1 may be determined as a ratio of a total capacity of the first area 211. The first threshold value TV1 may be variously determined, for example, as 5%, 10%, 15%, 20%, etc.

When the free capacity of the first area 211 is smaller than or equal to the first threshold value TV1, a write speed at which the controller 220 writes data in the nonvolatile memory device 210 may decrease, a speed at which the controller 220 accesses the nonvolatile memory device 210 may decrease, and an operating speed of the storage device 200 may decrease (a congestion event).

In response to the operating speed of the storage device 200 decreasing, in operation S340, the controller 220 may request the host device 100 to decrease a link width, that is, the number of lanes LANE included in the link LINK. In an example embodiment, the adjustment of the number of lanes LANE (e.g., the number of enabled lanes and the number of disabled lanes) may be requested such that a data transfer rate of the link LINK is similar to a speed at which the controller 220 writes data into the second area 212 (slower area).

That is, the controller 220 may detect the reduction of an operating speed in response to the free capacity of the first area 211 decreasing. In response to the operating speed decrease, the controller 220 may request the host device 100 to decrease a link width. Accordingly, the power consumption of the host device 100 and the storage device 200 may be reduced while a speed at which write data are processed by the storage device 200 is not hindered.

In an example embodiment, as described with reference to FIGS. 5 and 6, the controller 220 may adjust the number of enabled lanes of the link LINK (or the number of disabled lanes thereof) by setting the dynamic link control bit of the register in the L0 state and requesting the retrain operation.

Figure 10:
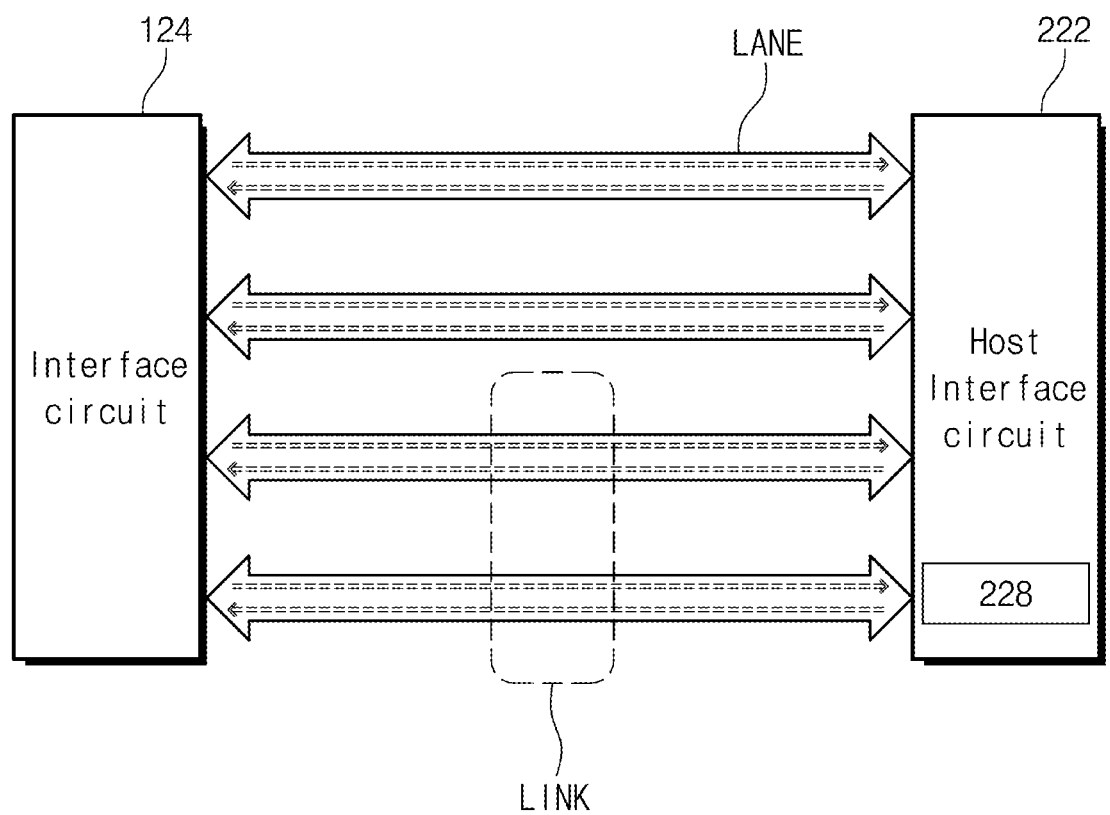
FIG. 10 illustrates an example in which a width of a link is reduced compared to FIG. 8.

FIG. 10 illustrates an example in which a width of the link LINK is reduced compared to FIG. 8. Referring to FIG. 10, a width of the link LINK may decrease from 4 to 2. In an example embodiment, the interface circuit 124 and the host interface circuit 222 may maintain two of four lanes at a disable state and may set the remaining lanes, that is, two lanes to an enable state so as be included in the link LINK. FIG. 10 illustrates that a host and storage device may be physically connected by a fixed number of wires which generally do not change with time. Also, in FIG. 10 the number of wires in an enable state can be configured dynamically; that is the number of wires in an enable state can be generally changed at different times. The expression "LINK" refers to a configuration of wires in an enable state at a given point in time.

Figure 11:
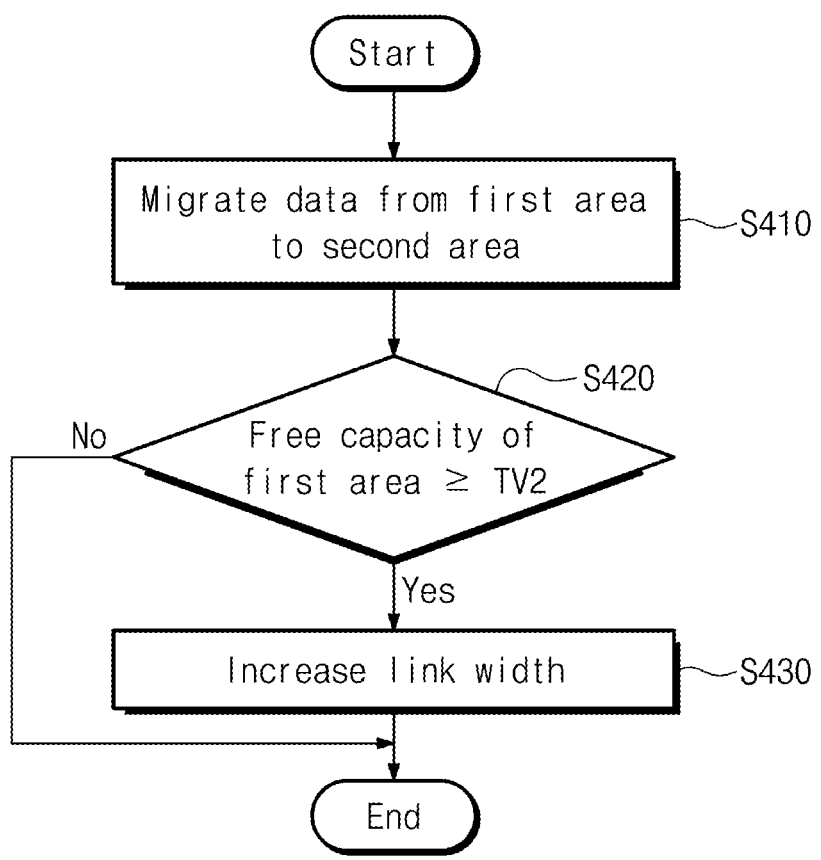
FIG. 11 illustrates a fourth example of an operating method of a storage device.

FIG. 11 illustrates a fourth example of an operating method of the storage device 200. Referring to FIGS. 1, 2, 3, and 11, in operation S410, the controller 220 may allow data written into the first area 211 of the nonvolatile memory device 210 to migrate to the second area 212. For example, the data that migrate to the second area 212 may be removed from the first area 211. That is, the free capacity of the first area 211 may increase.

In operation S420, the controller 220 may determine whether the free capacity of the first area 211 is greater than or equal to the second threshold value TV2. For example, the second threshold value TV2 may be determined as a ratio of a total capacity of the first area 211. The second threshold value TV2 may be variously determined, for example, as 25%, 30%, 35%, 40%, etc.

That is, when the free capacity of the second area 212 is greater than or equal to the second threshold value TV2, a write speed at which the controller 220 writes data into the nonvolatile memory device 210 may increase (or may be recovered), a speed at which the controller 220 accesses the nonvolatile memory device 210 may increase (or may be recovered), and an operating speed of the storage device 200 may increase (or may be recovered).

In response to the operating speed of the storage device 200 increasing (or being recovered), in operation S430, the controller 220 may increase (or recover) a data transfer rate of the link LINK. For example, the controller 220 may increase a link speed. The controller 220 may request an increase of a link speed by setting (or recovering) the dynamic link control bit of the register to the first value and requesting the retrain operation as described with reference to FIG. 5.

As described above, the host device 100 may read the register in response to an interrupt from the controller 220 or based on the polling. As described with reference to FIG. 6, the host device 100 and the controller 220 may increase (or recover) a link speed through the recovery state.

In an example embodiment, the operating speed of the storage device 200 may stepwise decrease. The nonvolatile memory device 210 may include three or more areas having different access (or write) speeds. When an access to a specific area (or a write operation for the specific area) is requested, the controller 220 may stepwise increase or decrease a data transfer rate of the link LINK. That is, the number of enabled lanes of the link LINK and the number of disabled lanes of the link LINK may be stepwise adjusted.

For example, as an operating speed decreases to a first step, the number of disabled lanes of the link LINK may decrease to the first step. As the operating speed decreases to a second step, the number of disabled lanes of the link LINK may decrease to the second step.

As the operating speed is recovered to the first step, the number of enabled lanes of the link LINK may be recovered to the first step. As the operating speed is recovered to the second step, the number of enabled lanes of the link LINK may be recovered to the second step.

Figure 12:
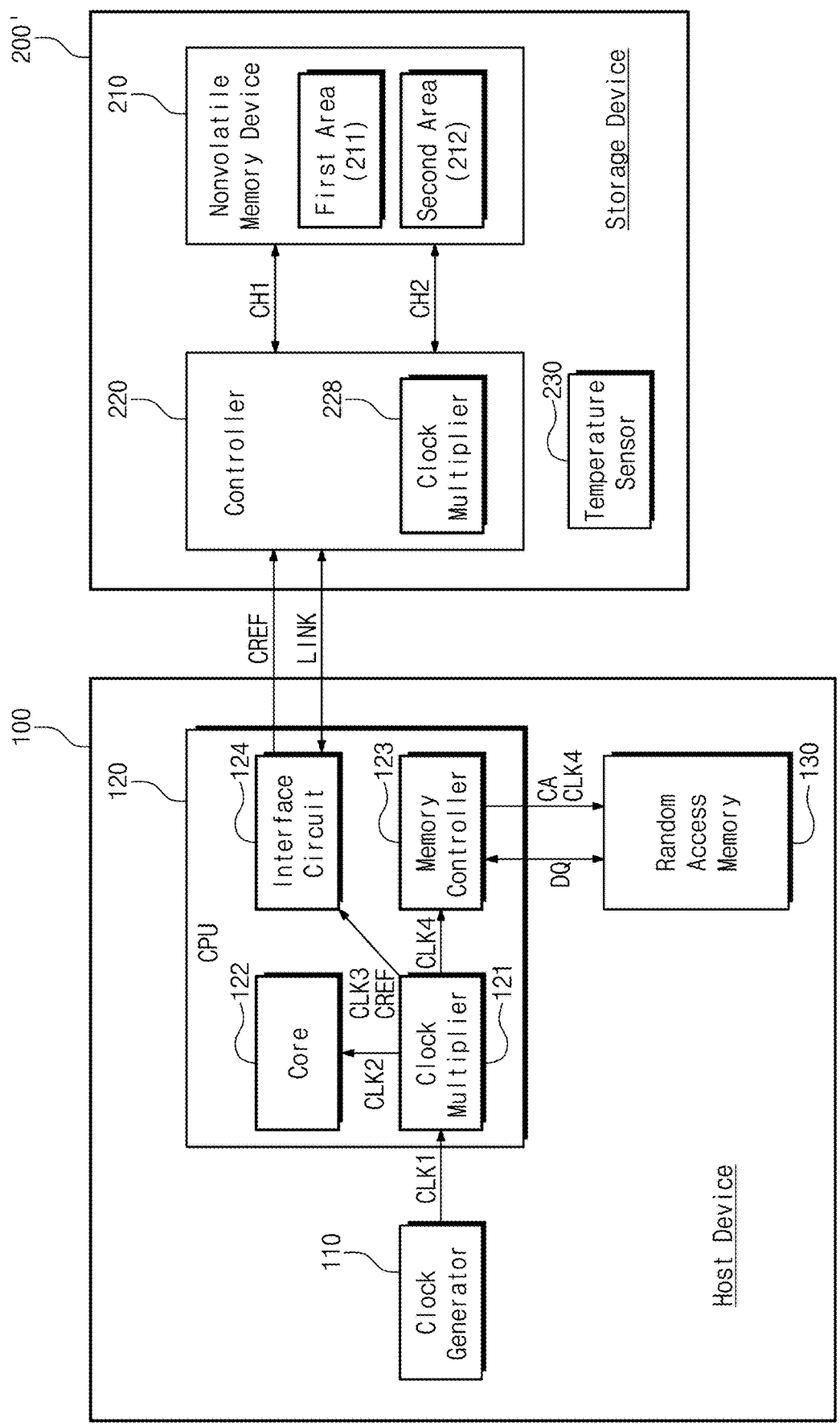
FIG. 12 illustrates an example in which a storage device according to another example embodiment establishes a link with the host device.

FIG. 12 illustrates an example in which a storage device 200' according to another example embodiment establishes the link LINK with the host device 100. Referring to FIG. 12, the host device 100 may correspond to the host device 100 of FIG. 1. Thus, additional description will be omitted to avoid redundancy. The storage device 200' may include the same components as the storage device 200 of FIG. 1 except that the storage device 200' further includes a temperature sensor 230. Thus, additional description will be omitted to avoid redundancy.

The controller 220 may receive temperature information indicating a current temperature (e.g., an internal temperature or a case temperature) of the storage device 200' from the temperature sensor 230. The controller 220 may perform dynamic temperature throttling based on a temperature that the temperature information indicates.

For example, as a temperature increases, the controller 220 may decrease a frequency of a clock signal used in the processor 224 or the bus 221. That is, in response to a temperature increase, the controller 220 may decrease an operating speed of the storage device 200'. In response to the operating speed decrease of the storage device 200', the controller 220 may decrease a data transfer rate of the link LINK.

Figure 13:
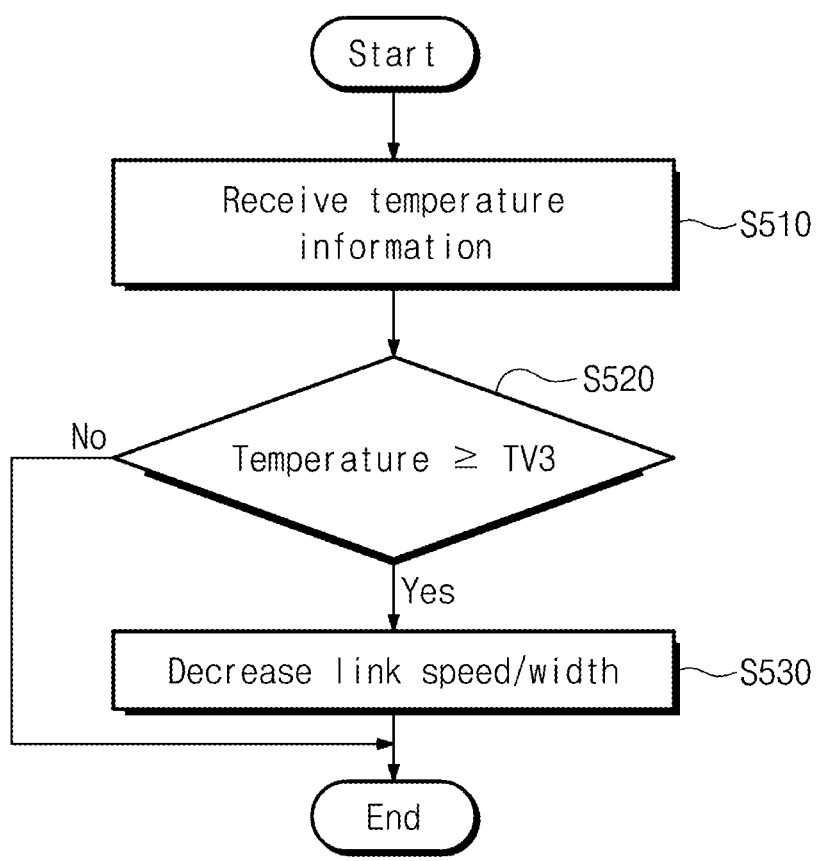
FIG. 13 illustrates a first example of an operating method of a storage device according to an example embodiment.

FIG. 13 illustrates a first example of an operating method of the storage device 200' according to an example embodiment. Referring to FIGS. 2, 3, 4, 12 and 13, in operation S510, the controller 220 may receive temperature information from the temperature sensor 230. In operation S520, the controller 220 may determine whether a temperature is greater than or equal to a third threshold value TV3.

When the temperature is greater than or equal to the third threshold value TV3, an operating speed of the storage device 200' may be decreased (dynamic temperature throttling). In response to the operating speed decrease of the storage device 200', in operation S530, the controller 220 may request the host device 100 to decrease a link speed or a link width.

For example, the controller 220 may request the host device 100 to decrease multiplication ratios of the clock multiplier 121 of the host device 100 and the clock multiplier 228 or 315 of the storage device 200'. Alternatively, the controller 220 may request the host device 100 to decrease the number of lanes LANE included in the link LINK.

That is, the controller 220 may detect the reduction of an operating speed in response to a temperature increase. In response to the operating speed decrease, the controller 220 may request the host device 100 to decrease a link speed. Accordingly, the power consumption of the host device 100 and the storage device 200' may be reduced in a state where a speed at which write data are processed is not hindered.

In an example embodiment, as described with reference to FIGS. 5 and 6, the controller 220 may adjust the multiplication ratios of the clock multiplier 121 of the host device 100 and the clock multiplier 228 or 315 of the storage device 200' or the number of enabled lanes of the link LINK (or the number of disabled lanes thereof) by setting the dynamic link control bit of the register in the L0 state and requesting the retrain operation.

As described above, the host device 100 may read the register in response to an interrupt from the controller 220 or based on the polling. As described with reference to FIG. 6, the host device 100 and the controller 220 may decrease a link speed or a link width through the recovery state.

Figure 14:
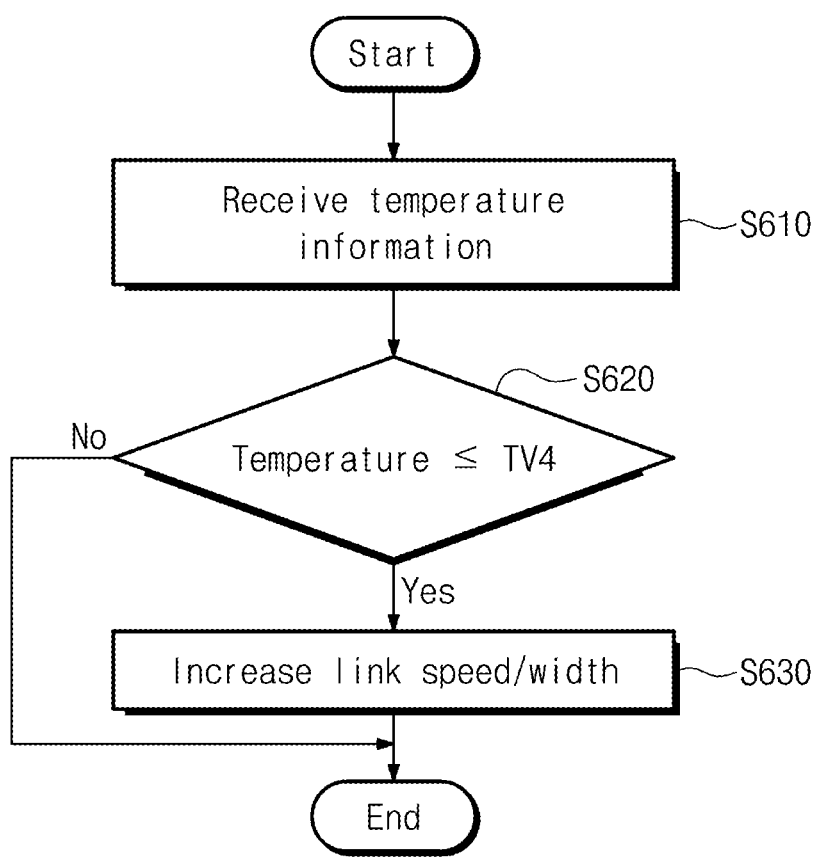
FIG. 14 illustrates a second example of an operating method of a storage device.

FIG. 14 illustrates a second example of an operating method of the storage device 200'. Referring to FIGS. 2, 3, 12, and 14, in operation S610, the controller 220 may receive temperature information from the temperature sensor 230. In operation S620, the controller 220 may determine whether a temperature is smaller than or equal to a fourth threshold value TV4. For example, the fourth threshold value TV4 may be the same as or different from the third threshold value TV3.

When the temperature is smaller than or equal to the fourth threshold value TV4, the controller 220 may release the dynamic temperature throttling. That is, when the temperature is smaller than or equal to the fourth threshold value TV4, a write speed at which the controller 220 writes data into the nonvolatile memory device 210 may be increased (or may be recovered), a speed at which the controller 220 accesses the nonvolatile memory device 210 may be increased (or may be recovered), and an operating speed of the storage device 200' may be increased (or may be recovered).

In response to the operating speed increase of the storage device 200' (or operating speed recovery), in operation S630, the controller 220 may increase (or recover) a data transfer rate of the link LINK. For example, the controller 220 may increase a link speed or a link width. The controller 220 may request an increase of a link speed or a link width by setting (or recovering) the dynamic link control bit of the register to the first value and requesting the retrain operation as described with reference to FIG. 5.

As described above, the host device 100 may read the register in response to an interrupt from the controller 220 or based on the polling. As described with reference to FIG. 6, the host device 100 and the controller 220 may increase (or recover) a link speed or a link width through the recovery state.

In an example embodiment, the operating speed of the storage device 200' may stepwise decrease. The controller 220 may compare a temperature with two or more different threshold values and may stepwise adjust a link speed or a link width based on the different threshold values.

For example, as an operating speed decreases to a first step, a data transfer rate of the link LINK may decrease to the first step. As the operating speed decreases to a second step, the data transfer rate of the link LINK may decrease to the second step. As the operating speed is recovered to the first step, the data transfer rate of the link LINK may be recovered to the first step. As the operating speed is recovered to the second step, the data transfer rate of the link LINK may be recovered to the second step.

In an example embodiment, the embodiment of the storage device 200 of FIG. 1 and the embodiment of the storage device 200' of FIG. 12 may be combined. The storage device 200' may adjust a data transfer rate of the link LINK based on a free capacity of the first area 211 and/or based on a temperature.

Also, the storage device 200 or 200' may selectively adjust a link speed and/or a link width for the purpose of adjusting a data transfer rate. The controller 220 may select one of the adjustment of a link speed and the adjustment of a link width. The controller 220 may select the adjustment of a link speed and the adjustment of a link width alternatively (or in a combination manner) depending on a desired decrease step of an operating speed.

In an example embodiment, the storage device 200 of FIG. 1 and the storage device 200' of FIG. 12 may further include a buffer memory disposed outside the nonvolatile memory device 210 and the controller 220. The controller 220 may write data provided from the host device 100 into the buffer memory and may write the data written into the buffer memory into the nonvolatile memory device 210.

Figure 15:
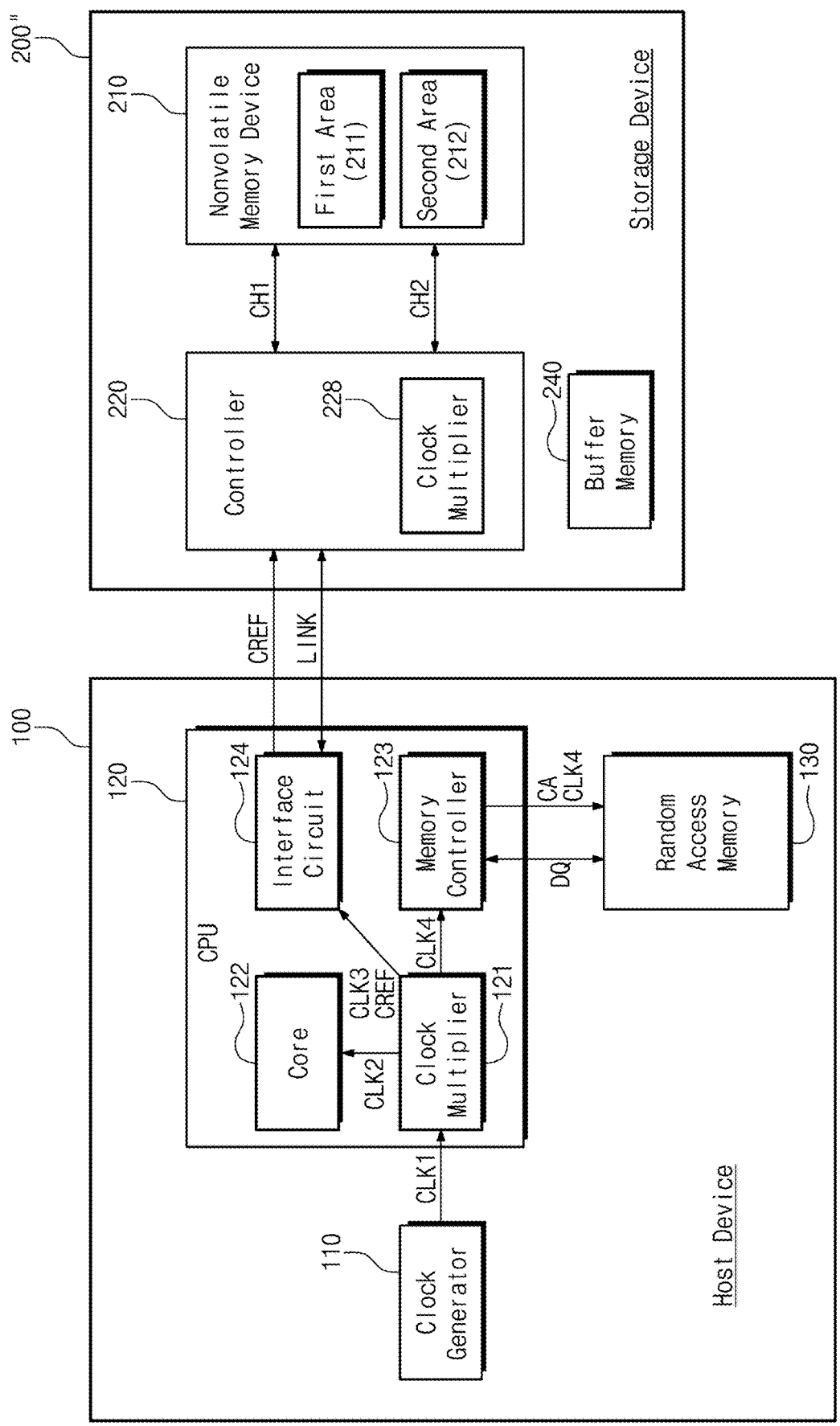
FIG. 15 illustrates an example in which a storage device according to another example embodiment establishes a link with a host device.

FIG. 15 illustrates an example in which a storage device 200" according to another example embodiment establishes the link LINK with the host device 100. Referring to FIG. 15, the host device 100 may be the same as the host device 100 of FIG. 1. Thus, repeated description will be omitted. The storage device 200" may include the same components as the storage device 200 of FIG. 1 except that the storage device 200" further includes a buffer memory 240. Thus, repeated description will be omitted.

The controller 220 may store data received from the host device 100 in the buffer memory 240. The controller 220 may support a write-back scheme to report a write completion to the host device 100 when the data are written into the buffer memory 240.

When a free capacity of the buffer memory 240 is insufficient, the controller 220 may perform a flush operation of writing data stored in the buffer memory 240 into the nonvolatile memory device 210. While the flush operation is performed, the controller 220 may not process a request of the host device 100. That is, the performance of operation of the storage device 200" may be reduced. In response to an operating speed of the storage device 200" decreasing, the controller 220 may decrease a data transfer rate of the link LINK.

For example, the controller 220 may decrease a data transfer rate of the link LINK in response to the free capacity of the buffer memory 240 being smaller than or equal to a fifth threshold value. The controller 220 may perform the flush operation in response to the free capacity of the buffer memory 240 being smaller than or equal to a sixth threshold value. The fifth threshold value may be greater than the sixth threshold value. That is, when a decrease of an operating speed of the storage device 200" is expected, the controller 220 may decrease a data transfer rate of the link LINK.

As described with reference to FIG. 12, the storage device 200" may further include the temperature sensor 230. The storage device 200" may be further configured to adjust a data transfer rate of the link LINK in response to the dynamic temperature throttling being enabled.

The example embodiments are described mainly with reference to the PCIe protocol. However, various protocols such as NVMe, SATA, SAS, USB, and UFS may be applicable to the embodiments.

In the above example embodiments, components according to the present disclosure are described by using the terms "first", "second", "third", and the like. However, the terms "first", "second", "third", and the like may be used to distinguish components from each other and do not limit the present disclosure. For example, the terms "first", "second", "third", and the like do not involve an order or a numerical meaning of any form.

In the above example embodiments, components according to embodiments are described by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit or circuits enrolled as intellectual property (IP).

According to the present disclosure, a storage device may adjust a transmission rate, at which the storage device communicates with an external host device, based on an internal operating speed. Accordingly, a storage device reducing power consumption according to a communication while communicating with an external host device at an improved communication speed and an operating method of the storage device are provided.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. A storage device comprising:
a nonvolatile memory device; and
a controller configured to:
   access the nonvolatile memory device based on a request from an external host device,
   receive a first clock signal from the external host device,
   generate a second clock signal through frequency multiplication of the first clock signal, and
   communicate with the external host device based on the second clock signal,
   wherein the controller is further configured to request the external host device to adjust a multiplication ratio for the frequency multiplication of the first clock signal.

2. The storage device of claim 1, wherein the controller is further configured to request the external host device to decrease the multiplication ratio in response to detecting a decrease in a speed at which the nonvolatile memory device is accessed.

3. The storage device of claim 1, wherein the controller is further configured to request the external host device to decrease the multiplication ratio in response to detecting a decrease in a write speed into the nonvolatile memory device.

4. The storage device of claim 1, wherein the nonvolatile memory device comprises a first area and a second area, and
wherein the controller is further configured to request the external host device to decrease the multiplication ratio in response to a free capacity of the first area being smaller than or equal to a first threshold value.

5. The storage device of claim 4, wherein the controller is further configured to:
allow data of the first area of the nonvolatile memory device to migrate to the second area, and
request the external host device to restore the multiplication ratio in response to the free capacity of the first area being greater than or equal to a second threshold value.

6. The storage device of claim 1, further comprising:
a temperature sensor configured to output temperature information,
wherein the controller is further configured to:
   receive the temperature information from the temperature sensor; and
   limit an operating speed of the storage device in response to a temperature indicated by the temperature information being greater than or equal to a first threshold value, and
wherein the controller is further configured to request the external host device to decrease the multiplication ratio in response to the temperature being greater than or equal to the first threshold value.

7. The storage device of claim 6, wherein the storage device is further configured to restore the operating speed of the storage device in response to the temperature being smaller than or equal to a second threshold value, and
wherein the controller is further configured to request the external host device to restore the multiplication ratio in response to the temperature being smaller than or equal to the second threshold value.

8. The storage device of claim 1, wherein the controller is further configured to request, by writing information of the multiplication ratio into a link control register, the external host device to adjust the multiplication ratio.

9. The storage device of claim 1, wherein the controller is further configured to request, by writing retrain information into a control register, a retrain operation for adjustment of the multiplication ratio by the external host device.

10. The storage device of claim 1, wherein the controller is further configured to request the external host device to adjust the multiplication ratio, by transmitting an interrupt to the external host device or by responding to a poll sent by the external host device.

11. The storage device of claim 1, wherein the controller is further configured to communicate with the external host device based on a peripheral component interconnect express (PCIe) protocol.

12. The storage device of claim 11, wherein the multiplication ratio is selected from a group of multiplication ratios including 25 times, 50 times, 80 times, 160 times, and 320 times.

13. A storage device comprising:
a nonvolatile memory device; and
a controller configured to:
   establish a link with an external host device based on two or more lanes, and
   access the nonvolatile memory device based on a request of the external host device transferred through the link,
   wherein the controller is further configured to request the external host device to disable at least one lane of two or more lanes included in the link.

14. The storage device of claim 13, wherein the nonvolatile memory device comprises a first area and a second area, and
wherein the controller is further configured to request the external host device to disable the at least one lane in response to a free capacity of the first area being smaller than or equal to a first threshold value.

15. The storage device of claim 13, further comprising a temperature sensor configured to output temperature information,
wherein the controller is further configured to:
   receive the temperature information from the temperature sensor; and
   limit an operating speed of the storage device in response to a temperature indicated by the temperature information being greater than or equal to a threshold value, and
wherein the controller is further configured to request that the external host device disable the at least one lane in response to the temperature being greater than or equal to the threshold value.

16. The storage device of claim 13, wherein the controller is further configured to communicate with the external host device based on a peripheral component interconnect express (PCIe) protocol, and
wherein the controller is further configured to establish the link based on a number of lanes, the number of lanes being 2, 4, 8, or 16 lanes.

17. An operating method of a storage device which includes a nonvolatile memory device and a controller, the operating method comprising:
establishing a link between the controller and an external host device, the link having a first link speed and a first link width;
accessing, by the controller, the nonvolatile memory device in response to a request received from the external host device via the link;
requesting, by the controller, the external host device to adjust a transmission rate defined by the first link speed and the first link width in response to detecting an operating speed decrease; and performing, by the controller, a retrain operation with the external host device.

18. The operating method of claim 17, wherein the nonvolatile memory device comprises a first area and a second area, the operating method further comprising:

detecting that the operating speed decreases, in response to a free capacity of the first area of the nonvolatile memory device being smaller than or equal to a threshold value.

19. The operating method of claim 17, wherein the storage device further includes a temperature sensor configured to output temperature information, the operating method further comprising:

limiting, at the controller, the operating speed of the storage device in response to a temperature indicated by the temperature information being greater than or equal to a threshold value; and detecting that the operating speed decreases, in response to the temperature being greater than or equal to the threshold value.

20. The operating method of claim 17, wherein the storage device further comprises a buffer memory, the operating method further comprising:

detecting that the operating speed decreases, in response to a free capacity of the buffer memory being smaller than or equal to a threshold value.

* * * * *